(12) United States Patent
Ogawa

(10) Patent No.: US 9,202,422 B2
(45) Date of Patent: Dec. 1, 2015

(54) LIQUID CRYSTAL DISPLAY DEVICE

(75) Inventor: Katsuya Ogawa, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 281 days.

(21) Appl. No.: 13/978,610

(22) PCT Filed: Jan. 6, 2012

(86) PCT No.: PCT/JP2012/050143
§ 371 (c)(1),
(2), (4) Date: Jul. 8, 2013

(87) PCT Pub. No.: WO2012/093710
PCT Pub. Date: Jul. 12, 2012

(65) Prior Publication Data
US 2013/0278575 A1    Oct. 24, 2013

(30) Foreign Application Priority Data

Jan. 7, 2011   (JP) ................................. 2011-001674

(51) Int. Cl.
*G09G 5/00*        (2006.01)
*G09G 3/36*        (2006.01)
(Continued)

(52) U.S. Cl.
CPC ............ *G09G 3/36* (2013.01); *G02F 1/134309* (2013.01); *G09G 3/3607* (2013.01); *G02F 2001/134345* (2013.01); *G09G 3/2074* (2013.01); *G09G 2300/0443* (2013.01); *G09G 2320/0252* (2013.01); *G09G 2320/041* (2013.01)

(58) Field of Classification Search
CPC .............. G09G 2300/0443; G09G 2320/0271; G09G 3/2803; G09G 3/288
See application file for complete search history.

(56) References Cited

U.S. PATENT DOCUMENTS

| 2002/0149598 | A1  | 10/2002 | Greier et al. |
| 2003/0025664 | A1* | 2/2003  | Koga et al. ...................... 345/89 |
| 2003/0071775 | A1* | 4/2003  | Ohashi et al. ................... 345/89 |

(Continued)

FOREIGN PATENT DOCUMENTS

| JP | 2005-316211 A | 11/2005 |
| JP | 4065780 B2   | 3/2008 |

(Continued)

OTHER PUBLICATIONS

International Search Report and Written Opinion corresponding to PCT/JP2012/050143, dated Mar. 19, 2012.

*Primary Examiner* — William Boddie
*Assistant Examiner* — Carolyn R Edwards
(74) *Attorney, Agent, or Firm* — Hauptman Ham, LLP

(57) ABSTRACT

A pixel of a liquid crystal panel is constituted by three subpixels. When the gradation of the pixel can be represented by only the subpixel, with setting the gradations of the subpixels to their minimum gradations, the gradation of the subpixel is determined. When the gradation of the pixel is represented by the subpixels, with setting the gradation of the subpixel to its maximum gradation and setting the gradation of the subpixel to its minimum gradation, the gradation of the subpixel is determined so that the ratio of the transmittance of the subpixel to the transmittance of the pixel is less than a limit value. When the gradation of the subpixel cannot be determined to satisfy a condition, with setting the gradation of the subpixel to its minimum gradation, the gradations of the subpixels are determined to obtain a gradation higher than or equal to the gradation of the pixel.

13 Claims, 13 Drawing Sheets

(51) Int. Cl.
*G02F 1/1343* (2006.01)
*G09G 3/20* (2006.01)

(56) References Cited

U.S. PATENT DOCUMENTS

| | | | |
|---|---|---|---|
| 2003/0160750 A1 | 8/2003 | Ueda et al. | |
| 2003/0227429 A1 | 12/2003 | Shimoshikiryo | |
| 2005/0253797 A1 | 11/2005 | Kamada et al. | |
| 2006/0103615 A1* | 5/2006 | Shih et al. | 345/88 |
| 2011/0254759 A1* | 10/2011 | Mori et al. | 345/88 |
| 2011/0254879 A1* | 10/2011 | Mori et al. | 345/690 |

FOREIGN PATENT DOCUMENTS

| | | |
|---|---|---|
| JP | 4169992 B2 | 10/2008 |
| JP | 4342200 B2 | 10/2009 |
| WO | 02059685 A2 | 8/2002 |

\* cited by examiner

LIQUID CRYSTAL DISPLAY DEVICE

RELATED APPLICATIONS

The present application is a National Phase Application of International Application Number PCT/JP2012/050143, Jan. 6, 2012, and claims priority from Japanese Application Number 2011-001674, filed Jan. 7, 2011.

TECHNICAL FIELD

The present invention relates to a liquid crystal display device, and more particularly to a normally black mode liquid crystal display device that performs monochrome gradation display.

BACKGROUND ART

In recent years, liquid crystal display devices are used in various applications. Liquid crystal display devices are used for, for example, display of instruments on a dashboard of an automobile. In general, devices for automobile use are required to operate in a wider temperature range than that of devices used indoors. However, the response speed of liquid crystal is slow at low temperatures. Hence, liquid crystal display devices for automobile use have a problem of a slow response speed at low temperatures. The slow response speed not only gives a poor appearance, but may also cause trouble in safety.

Meanwhile, from the viewpoint of an increase in contrast and design, there is a strong demand for normally black mode. In a normally black mode liquid crystal display device, a low voltage is applied when a low gradation is displayed, and a high voltage is applied when a high gradation is displayed. In a VA (Vertical Alignment)-type liquid crystal display device having normally black characteristics, the response speed is slow when a low gradation is displayed. Therefore, when a VA-type liquid crystal display device is used for automobile use, the response speed when a low gradation is displayed at low temperatures is particularly problematic.

In connection with the invention of the present application, the following documents are known. Patent Document 1 describes that each pixel of a liquid crystal display device is provided with two subpixels, and a drive signal that rises in a low-gradation area is applied to one of the subpixels and a drive signal that rises in a high-gradation area is applied to the other subpixel, by which the gradation characteristics for an intermediate gradation area is improved. Patent Document 2 describes that in a color liquid crystal display device, the gradation values of subpixels are modified to reduce the number of subpixels that display halftones, by which viewing angle characteristics are improved. Patent Document 3 describes that in a liquid crystal display device, a drive voltage is applied to liquid crystals of pixels only for a predetermined period of time during one frame period, and the application time of the drive voltage is changed according to the magnitude of a data voltage, by which viewing angle characteristics are improved. Patent Document 4 describes that each pixel of a liquid crystal display device is provided with two subpixels, and the difference $\Delta V$ between effective voltages applied to the two subpixels for a gradation gk in a given range is set to satisfy $\Delta V(gk) > 0$ and $\Delta V(gk) \geq \Delta V(gk+1)$, by which the viewing angle dependence of $\gamma$ characteristics is improved.

PRIOR ART DOCUMENTS

Patent Documents

[Patent Document 1] Japanese Laid-Open Patent Publication No. 2005-316211
[Patent Document 2] Japanese Patent No. 4065780
[Patent Document 3] Japanese Patent No. 4169992
[Patent Document 4] Japanese Patent No. 4342200

SUMMARY OF THE INVENTION

Problems to be Solved by the Invention

A large-size liquid crystal display device such as a television performs overshoot drive or the like to improve response speed. However, to perform overshoot drive, there is a need to add a frame memory, which increases the cost of the liquid crystal display device. Hence, it is difficult in terms of cost to perform overshoot drive in small and medium-size liquid crystal display devices for automobile use, or the like, and monochrome liquid crystal display devices which feature low cost.

An object of the present invention is therefore to provide a liquid crystal display device that improves response speed at low cost.

Means for Solving the Problems

According to a first aspect of the present invention, there is provided a normally black mode liquid crystal display device that performs monochrome gradation display, the liquid crystal display device including: a liquid crystal panel including a plurality of pixels, each constituted by a plurality of subpixels whose transmittances can be controlled independently of each other; a gradation converting unit that converts a gradation of each pixel included in an input video signal to gradations of a plurality of subpixels; and a drive circuit that drives the liquid crystal panel based on a video signal obtained by the gradation converting unit, wherein characteristics of the gradation conversion by the gradation converting unit are obtained by performing, in a case where the gradation of the pixel can be represented by only one minimum-area subpixel, a process in which with setting gradations of other subpixels to their minimum gradations, a gradation of the minimum-area subpixel is determined, and by performing, in other cases, one of a first process in which one subpixel is selected as a first subpixel, and with setting gradations of other subpixels to their maximum gradations or minimum gradations, a gradation of the first subpixel is determined so that a ratio of a transmittance of the first subpixel to a transmittance of the pixel is less than a limit value, and when the gradation of the first subpixel cannot be determined to satisfy the condition regarding the transmittances, a plurality of subpixels are selected as second subpixels, and with setting a gradation of a remaining subpixel to its maximum gradation or minimum gradation, gradations of the second subpixels are determined to obtain a gradation higher than or equal to the gradation of the pixel; a second process in which the gradation of the first subpixel is determined with changing the gradations set to other subpixels; and a third process in which one subpixel different from the first subpixel is selected as a third subpixel, and with setting gradations of other subpixels to their maximum gradations or minimum gradations, a gradation of the third subpixel is determined.

According to a second aspect of the present invention, in the first aspect of the present invention, each pixel of the liquid crystal panel is constituted by a plurality of subpixels having equal areas.

According to a third aspect of the present invention, in the second aspect of the present invention, each pixel of the liquid crystal panel is constituted by three subpixels with an area ratio of 1:1:1.

According to a fourth aspect of the present invention, in the first aspect of the present invention, each pixel of the liquid crystal panel is constituted by a plurality of subpixels including subpixels having different areas.

According to a fifth aspect of the present invention, in the fourth aspect of the present invention, each pixel of the liquid crystal panel is constituted by three subpixels with an area ratio of 1:2:2.

According to a sixth aspect of the present invention, in the first aspect of the present invention, each pixel of the liquid crystal panel is constituted by a plurality of subpixels having different areas.

According to a seventh aspect of the present invention, in the sixth aspect of the present invention, each pixel of the liquid crystal panel is constituted by three subpixels with an area ratio of 1:2:3.

According to an eighth aspect of the present invention, in the first aspect of the present invention, the gradation converting unit includes a look up table, and converts a gradation of a pixel into gradations of a plurality of subpixels using the look up table.

According to a ninth aspect of the present invention, in the eighth aspect of the present invention, the gradation converting unit includes a plurality of look up tables in association with a plurality of gamma characteristics, and converts a gradation of a pixel into gradations of a plurality of subpixels using a look up table selected from the plurality of look up tables.

According to a tenth aspect of the present invention, in the first aspect of the present invention, the limit value is a value of 0.1 or less.

According to an eleventh aspect of the present invention, in the first aspect of the present invention, the limit value is a value of 0.05 or less.

According to a twelfth aspect of the present invention, in the first aspect of the present invention, the liquid crystal panel is a vertical alignment-type liquid crystal panel.

According to a thirteenth aspect of the present invention, there is provided a method of driving a normally black mode liquid crystal display device that has a liquid crystal panel including a plurality of pixels, each constituted by a plurality of subpixels whose transmittances are controlled independently of each other, and that performs monochrome gradation display, the method including the steps of: converting a gradation of each pixel included in an input video signal to gradations of a plurality of subpixels; and driving the liquid crystal panel based on an obtained video signal, wherein characteristics of the gradation conversion in the step of performing the gradation conversion are obtained by performing, in a case where the gradation of the pixel can be represented by only one minimum-area subpixel, a process in which with setting gradations of other subpixels to their minimum gradations, a gradation of the minimum-area subpixel is determined, and by performing, in other cases, one of a first process in which one subpixel is selected as a first subpixel, and with setting gradations of other subpixels to their maximum gradations or minimum gradations, a gradation of the first subpixel is determined so that a ratio of a transmittance of the first subpixel to a transmittance of the pixel is less than a limit value, and when the gradation of the first subpixel cannot be determined to satisfy the condition regarding the transmittances, a plurality of subpixels are selected as second subpixels, and with setting a gradation of a remaining subpixel to its maximum gradation or minimum gradation, gradations of the second subpixels are determined to obtain a gradation higher than or equal to the gradation of the pixel; a second process in which the gradation of the first subpixel is determined with changing the gradations set to other subpixels; and a third process in which one subpixel different from the first subpixel is selected as a third subpixel, and with setting gradations of other subpixels to their maximum gradations or minimum gradations, a gradation of the third subpixel is determined.

Effects of the Invention

According to the first or thirteenth aspect of the present invention, in the case where the gradation of a pixel can be represented by only a minimum-area subpixel, a voltage higher than or equal to a voltage required to represent the gradation of the pixel is applied to the minimum-area subpixel. In other cases, a voltage higher than or equal to the voltage required to represent the gradation of the pixel is applied to a first subpixel, a second subpixel, or a third subpixel. As such, a voltage higher than or equal to the voltage required to represent the gradation of the pixel is applied to at least one of the plurality of subpixels forming the pixel. In addition, unlike a liquid crystal display device that performs overshoot drive, there is no need to provide a frame memory. Therefore, response speed can be improved at low cost.

According to the second or third aspect of the present invention, by forming a pixel using subpixels having equal areas, response speed can be improved using pixels having a simple configuration.

According to the fourth to seventh aspects of the present invention, by forming a pixel using subpixels having different areas, compared to the case where a pixel is formed using subpixels having equal areas, the area of a minimum-area subpixel is reduced, thereby increasing a voltage applied to the minimum-area subpixel when a low gradation is displayed, enabling to improve the response speed when the low gradation is displayed.

According to the eighth aspect of the present invention, by providing a look up table in the gradation converting unit, gradation conversion can be easily performed using the look up table.

According to the ninth aspect of the present invention, by providing a plurality of look up tables in the gradation converting unit in association with a plurality of gamma characteristics and selecting a look up table used for gradation conversion, various types of $\gamma$ characteristics can be achieved.

According to the tenth or eleventh aspect of the present invention, by using a value of 0.1 or less or a value of 0.05 or less as the limit value for the condition regarding the transmittances, the ratio of the transmittance of the first subpixel to the transmittance of the pixel is reduced, thereby reducing the influence of the response time of the first subpixel exerted on the overall response time, enabling to improve response speed.

According to the twelfth aspect of the present invention, in a liquid crystal display device including a vertical alignment-type liquid crystal panel, response speed can be improved at low cost.

MODES FOR CARRYING OUT THE INVENTION

First Embodiment

Figure 1:
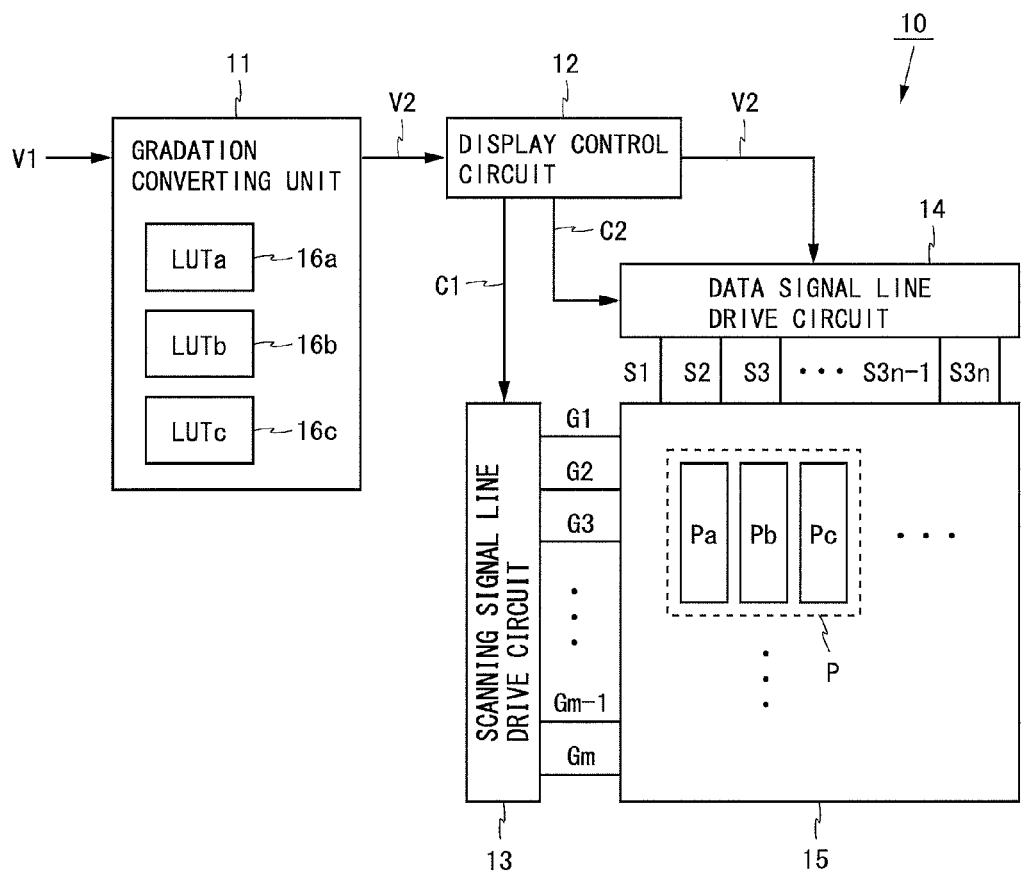
FIG. 1 is a block diagram showing a configuration of a liquid crystal display device according to a first embodiment of the present invention.

FIG. 1 is a block diagram showing a configuration of a liquid crystal display device according to a first embodiment of the present invention. A liquid crystal display device 10 shown in FIG. 1 includes a gradation converting unit 11, a display control circuit 12, a scanning signal line drive circuit 13, a data signal line drive circuit 14, and a liquid crystal panel 15. The liquid crystal panel 15 is a normally black mode monochrome liquid crystal panel. The liquid crystal display device 10 performs monochrome gradation display based on an input video signal V1. In the following, m and n are integers greater than or equal to 2, i is an integer between 1 and m inclusive, j is equal to (3k−2), and k is an integer between 1 and n inclusive.

The liquid crystal panel 15 includes m scanning signal lines G1 to Gm and 3n data signal lines S1 to S3n. The scanning signal lines G1 to Gm are arranged parallel to one another. The data signal lines S1 to S3n are arranged parallel to one another so as to intersect the scanning signal lines G1 to Gm perpendicularly. The scanning signal lines G1 to Gm and the data signal lines S1 to S3n intersect each other at (m×3n) points. One subpixel is arranged at a corresponding one of the (m×3n) intersections. The (m×3n) subpixels are grouped into subpixels Pa corresponding to the data signal lines S1, S4, . . . , S3n−2, subpixels Pb corresponding to the data signal lines S2, S5, . . . , S3n−1, and subpixels Pc corresponding to the data signal lines S3, S6, . . . , S3n. Three subpixels Pa, Pb, and Pc arranged side by side in the extending direction of the scanning signal lines G1 to Gm (in FIG. 1, a lateral direction) form one pixel P. As such, in the liquid crystal panel 15, the (m×n) pixels P are formed. For the liquid crystal panel 15, for example, a VA-type liquid crystal panel is used.

Figure 2:
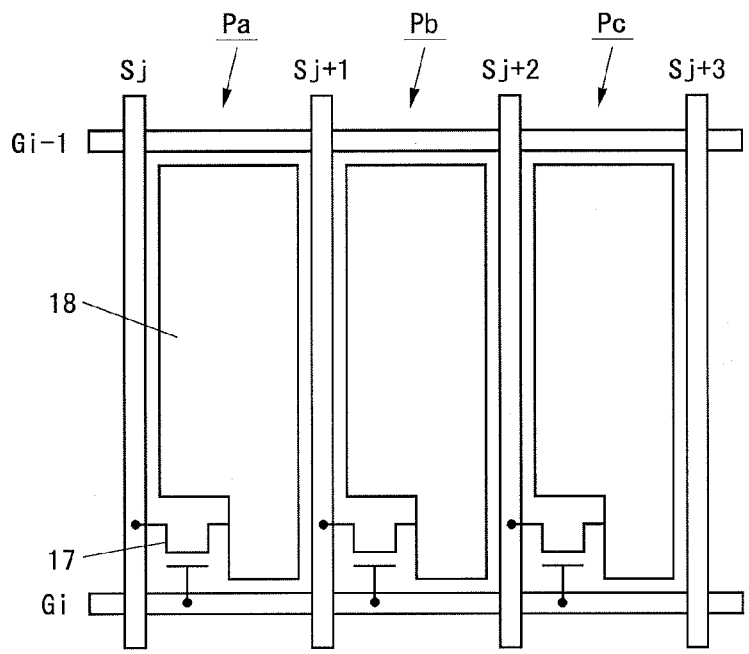
FIG. 2 is a diagram showing a configuration of a pixel of the liquid crystal display device according to the first embodiment.

FIG. 2 is a diagram showing a configuration of a pixel P. As shown in FIG. 2, the pixel P is constituted by three subpixels Pa, Pb, and Pc. The subpixel Pa includes a switching element 17 and a pixel electrode 18. The switching element 17 is configured by an N-channel type thin film transistor. A gate terminal of the switching element 17 is connected to a scanning signal line Gi, a source terminal of the switching element 17 is connected to a data signal line Sj, and a drain terminal of the switching element 17 is connected to the pixel electrode 18. The subpixels Pb and Pc have the same configuration as the subpixel Pa. A source terminal of a switching element 17 in the subpixel Pb is connected to a data signal line Sj+1, and a source terminal of a switching element 17 in the subpixel Pc is connected to a data signal line Sj+2. In the present embodiment, the subpixels Pa, Pb, and Pc have equal areas, i.e., the area ratio of the subpixels Pa, Pb, and Pc is 1:1:1.

The subpixels Pa, Pb, and Pc include the switching elements 17 that operate independently of one another, and the source terminals of the respective switching elements 17 are connected to the different data signal lines Sj, Sj+1, and Sj+2. Therefore, by controlling the switching elements 17 in the subpixels Pa, Pb, and Pc to an on state and applying different voltages to the data signal lines Sj, Sj+1, and Sj+2, the different voltages can be applied to the subpixels Pa, Pb, and Pc. In the liquid crystal display device 10, the total luminance of the subpixels Pa, Pb, and Pc is the luminance of the pixel P.

Referring back to FIG. 1, a detail of the liquid crystal display device 10 will be described. The input video signal V1 inputted to the liquid crystal display device 10 includes gradations to be displayed by the (m×n) pixels P (hereinafter, referred to as the target gradations L). The input video signal V1 is converted to a video signal V2 by the gradation converting unit 11. The video signal V2 includes gradations to be displayed by the (m×3n) subpixels Pa, Pb, and Pc (hereinafter, referred to as the display gradations La, Lb, and Lc, respectively).

The gradation converting unit 11 includes three look up tables (hereinafter, referred to as the LUTs) 16a, 16b, and 16c. The LUT 16a stores the display gradations La associated with the target gradations L. Likewise, the LUTs 16b and 16c store the display gradations Lb and Lc, respectively, which are associated with the target gradations L. The gradation converting unit 11 converts, using the LUTs 16a, 16b, and 16c, a target gradation L of a pixel P to display gradations La, Lb, and Lc of subpixels Pa, Pb, and Pc. By thus providing the LUTs 16a, 16b, and 16c in the gradation converting unit 11, gradation conversion can be easily performed using the LUTs. A method of determining display gradations La, Lb, and Lc will be described later.

The video signal V2 outputted from the gradation converting unit 11 is supplied to the display control circuit 12. The display control circuit 12 outputs a timing control signal C1 to the scanning signal line drive circuit 13, and outputs a timing control signal C2 and the video signal V2 to the data signal line drive circuit 14. The scanning signal line drive circuit 13 and the data signal line drive circuit 14 function as a drive circuit that drives the liquid crystal panel 15 based on the video signal V2 obtained by the gradation converting unit 11. The scanning signal line drive circuit 13 selects one scanning signal line in turn from the scanning signal lines G1 to Gm in accordance with the timing control signal C1, and applies a voltage (high-level voltage) that places the switching elements 17 in an on state to the selected scanning signal line. By this, the switching elements 17 in the 3n subpixels are placed in an on state. The data signal line drive circuit 14 applies voltages according to the video signal V2 to the data signal lines S1 to S3n in accordance with the timing control signal C2. By this, 3n voltages according to the video signal V2 are applied to the 3n subpixels, respectively. The transmittance (luminance) of a subpixel changes according to a voltage applied thereto.

As such, in the liquid crystal display device 10, a pixel P is constituted by three subpixels Pa, Pb, and Pc whose transmittances (luminances) can be controlled independently of one another, and the total luminance of the subpixels Pa, Pb, and Pc is the luminance of the pixel P. The liquid crystal display device 10 performs monochrome gradation display by converting a target gradation L of the pixel P to display gradations La, Lb, and Lc of the subpixels Pa, Pb, and Pc and driving the liquid crystal panel 15 so that gradations to be displayed by the subpixels Pa, Pb, and Pc are La, Lb, and Lc, respectively.

A method of determining display gradations La, Lb, and Lc will be described below. When the transmittance corresponding to a target gradation L is T and the transmittances corresponding to display gradations La, Lb, and Lc are Ta, Tb, and Tc, respectively, the following equation (1) holds between the transmittances:

$$T = Ta \times \tfrac{1}{3} + Tb \times \tfrac{1}{3} + Tc \times \tfrac{1}{3} \quad (1)$$

In the present embodiment, by changing the display gradation of one subpixel according to the target gradation L, a transmittance of 0 to 33.3% can be achieved. In addition, by setting the display gradation of one subpixel to its maximum gradation and changing the display gradation of another subpixel according to the target gradation L, a transmittance of 33.3 to 66.7% can be achieved. In addition, by setting the display gradations of two subpixels to their maximum gradations and changing the display gradation of the remaining subpixel according to the target gradation L, a transmittance of 66.7% to 100% can be achieved. Hence, by dividing an analysis into three cases according to the target gradation L of the pixel P and performing a process according to each case, the display gradations La, Lb, and Lc are determined.

In the case where the target gradation L of the pixel P can be represented by only the subpixel Pa, with setting the gradations of other subpixels Pb and Pc to their minimum gradations, the display gradation La of the subpixel Pa is determined. In other cases (i.e., in the case where the target gradation L of the pixel P cannot be represented by only the subpixel Pa), one subpixel is selected from the subpixels Pa, Pb, and Pc (hereinafter, the subpixel selected at this time is referred to as the "first subpixel"), and with setting the gradations of other subpixels to their maximum gradations or minimum gradations, the display gradation of the first subpixel is determined so that the ratio of the transmittance of the first subpixel to the transmittance T of the pixel P is less than a limit value K. However, when the display gradation of the first subpixel cannot be determined to satisfy the condition regarding the transmittances, a plurality of subpixels are selected from the subpixels Pa, Pb, and Pc (hereinafter, the subpixels selected at this time are referred to as the "second subpixels"), and with setting the gradation of the remaining subpixel to its maximum gradation or minimum gradation, the display gradations of the second subpixels are determined to obtain a gradation higher than or equal to the target gradation L of the pixel P. The limit value K is set to, for example, a value of 0.1 or less or a value of 0.05 or less.

The display gradations La, Lb, and Lc determined by the above-described method are stored in the LUTs 16a, 16b, and 16c, respectively, and are used when the target gradation L of the pixel is converted to the display gradations La, Lb, and Lc of the subpixels.

In the case where the target gradation L of the pixel P can be represented by only the subpixel Pa, a voltage higher than or equal to a voltage required to represent the target gradation L of the pixel P is applied to the subpixel Pa. In other cases, a voltage higher than or equal to the voltage required to represent the target gradation L of the pixel P is applied to the first subpixel or the second subpixels. As such, a voltage higher than or equal to the voltage required to represent the target gradation L of the pixel P is applied to at least one of the three subpixels Pa, Pb, and Pc. In addition, unlike a liquid crystal display device that performs overshoot drive, there is no need to provide a frame memory. Therefore, according to the liquid crystal display device 10 according to the present embodiment, response speed can be improved at low cost.

For example, when the transmittance T corresponding to the target gradation L of the pixel P is 33%, the gradation converting unit 11 converts the target gradation L of the pixel P to a display gradation La corresponding to a transmittance of 100%, a display gradation Lb corresponding to a transmittance of 0%, and a display gradation Lc corresponding to a transmittance of 0%. At this time, a voltage corresponding to a transmittance of 100% is applied to the subpixel Pa. The voltage applied to the subpixel Pa at this time is higher than a voltage that is required to adjust a transmittance of the pixel P to 33% when the pixel is not divided into subpixels. Therefore, according to the liquid crystal display device 10, compared to a liquid crystal display device in which a pixel is not divided into a plurality of subpixels, the response speed when the transmittance T of the pixel P is 33% can be improved.

In addition, in the liquid crystal display device 10 according to the present embodiment, a pixel P of the liquid crystal panel 15 is formed using subpixels Pa, Pb, and Pc having equal areas. Therefore, response speed can be improved using pixels having a simple configuration. In addition, by using a value of 0.1 or less or a value of 0.05 or less as the limit value for the condition regarding the transmittances, the ratio of the transmittance of the first subpixel to the transmittance T of the pixel P is reduced, thereby reducing the influence of the response time of the first subpixel exerted on the overall response time, enabling to improve response speed.

A specific example of the method of determining display gradations La, Lb, and Lc will be described below. In the following description, the target gradation L and the display gradations La, Lb, and Lc are integers between 0 and 63 inclusive, and γ characteristics of γ=2.2 are to be achieved. In addition, the limit value K for transmittance is 0.05. The following equations (2) to (5) hold between the target grada tion L, the display gradations La, Lb, and Lc, and the transmittances T, Ta, Tb, and Tc:

$$T=(L/63)^{2.2} \quad (2)$$

$$Ta=(La/63)^{2.2} \quad (3)$$

$$Tb=(Lb/63)^{2.2} \quad (4)$$

$$Tc=(Lc/63)^{2.2} \quad (5)$$

Figure 3:
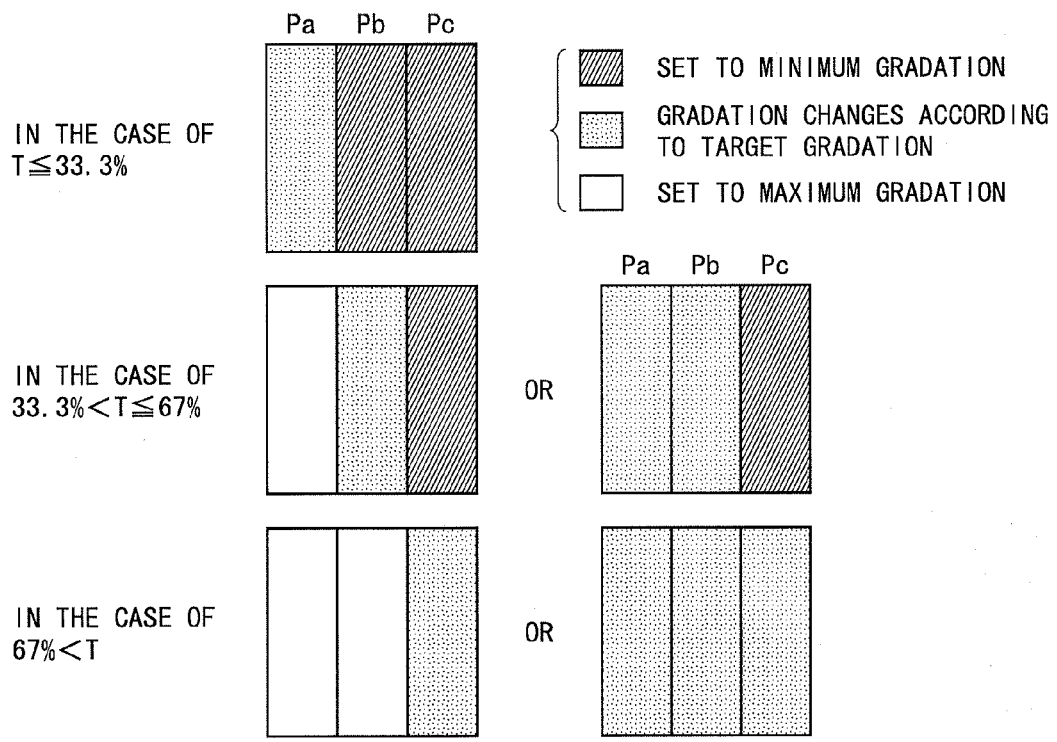
FIG. 3 is a diagram for describing a method of determining the display gradations of subpixels of the liquid crystal display device according to the first embodiment.
Figure 4:
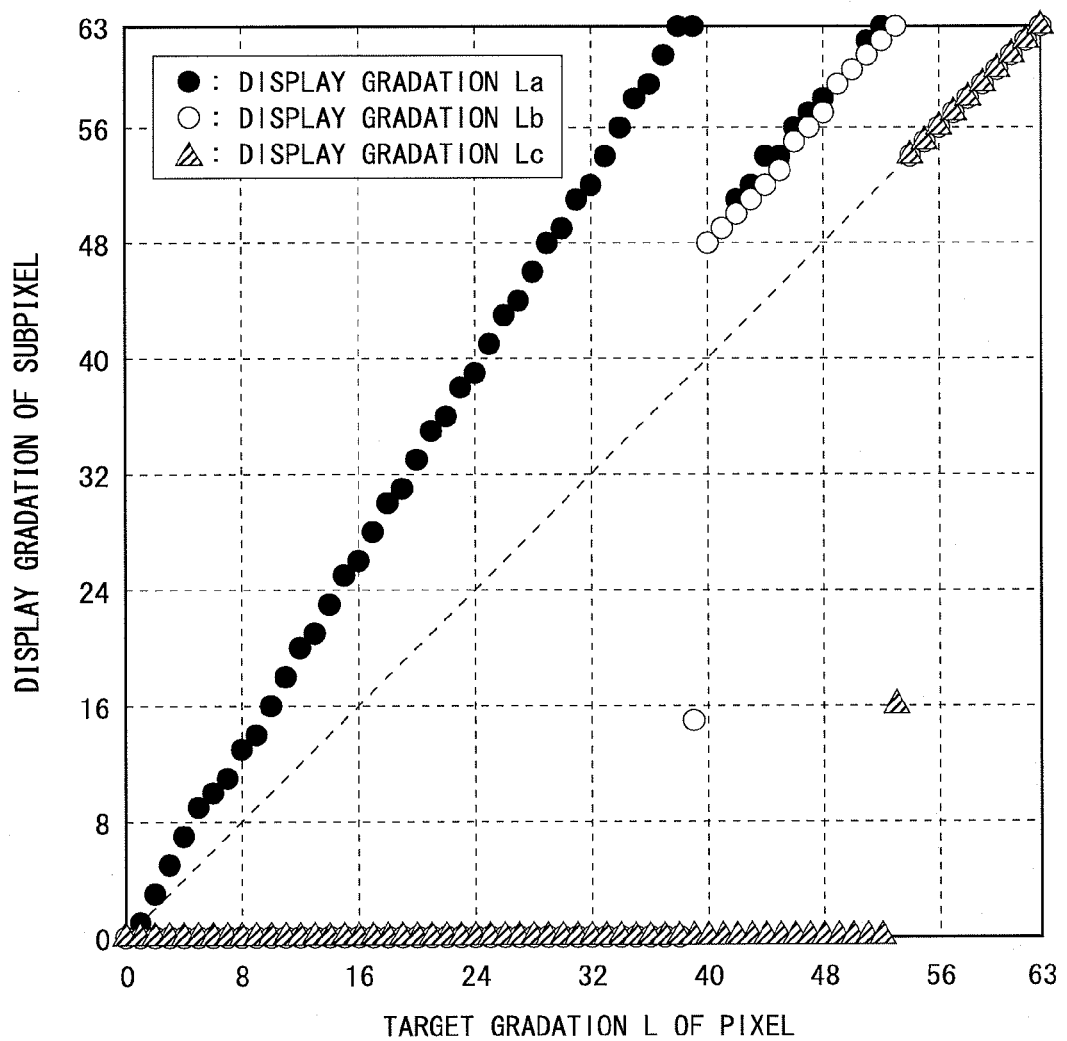
FIG. 4 is a diagram showing the gradation conversion characteristics of the liquid crystal display device according to the first embodiment.

When determining the display gradations La, Lb, and Lc corresponding to the target gradation L, first, a transmittance T (0%≤T≤100%) corresponding to the target gradation L is determined using the above equation (2). Then, an analysis is divided into three cases according to the determined transmittance T, and a process according to each case is performed (see FIG. 3). In FIG. 3, hatched rectangles represent subpixels where the minimum gradation is set, and blank rectangles represent subpixels where the maximum gradation is set. Dotted rectangles represent subpixels whose gradations change according to the target gradation L. Association of the display gradations La, Lb, and Lc determined by the following method with the target gradation L is as shown in FIG. 4. Of the three cases shown below, the target gradation L can be represented by only one subpixel only in the case of (A1). Since the areas of the subpixels Pa, Pb, and Pc are equal to one another, the subpixel Pa can be said to be a minimum-area subpixel.

(A1) In the Case of T≤33.3%

To represent the target gradation L, the subpixel Pa is selected. With setting the display gradations Lb and Lc to their minimum gradations, the display gradation La is determined according to the target gradation L. Specifically, with setting Lb=Lc=0, La is determined so that |T−Ta×⅓| is minimized.

(A2) In the Case of 33.3%<T≤67%

The subpixel Pb is selected as a first subpixel, and with setting the display gradation La to its maximum gradation and setting the display gradation Lc to its minimum gradation, the display gradation Lb is determined according to the target gradation L to satisfy the condition regarding the transmittances. When the display gradation Lb cannot be determined to satisfy the condition, the subpixels Pa and Pb are selected as second subpixels, and with setting the display gradation Lc to its minimum gradation, the display gradations La and Lb are determined to obtain a gradation higher than or equal to the target gradation L. Specifically, first, with setting La=63 and Lc=0, Lb is determined so that |T−(Ta×⅓+Tb×⅓)| is minimized. When the determined Lb does not satisfy the condition "(Tb×⅓)/(Ta×⅓+Tb×⅓)<0.05", i.e., the condition "Tb/(Ta+Tb)<0.05", with setting Lc=0, maximum La and Lb which satisfy La and Lb≥L and at which |T−(Ta×⅓+Tb×⅓)| is minimized are selected.

(A3) In the Case of 67%<T

The subpixel Pc is selected as a first subpixel, and with setting the display gradations La and Lb to their maximum gradations, the display gradation Lc is determined according to the target gradation L to satisfy the condition regarding the transmittances. When the display gradation Lc cannot be determined to satisfy the condition, the subpixels Pa, Pb, and Pc are selected as second subpixels, and the display gradations La, Lb, and Lc are determined to obtain a gradation higher than or equal to the target gradation L. Specifically, first, with setting La=Lb=63, Lc is determined so that |T−(Ta×⅓+Tb×⅓+Tc×⅓)1 is minimized. When the determined Lc does not satisfy the condition "(Tc×⅓)/(Ta×⅓+Tb×⅓+Tc×⅓)<0.05", i.e., the condition "Tc/(Ta+Tb+Tc)<0.05", maximum La, Lb, and Lc which satisfy La, Lb, and Lc≥L and at which |T−(Ta×⅓+Tb×⅓+Tc×⅓)| is minimized are selected.

Figure 5A:
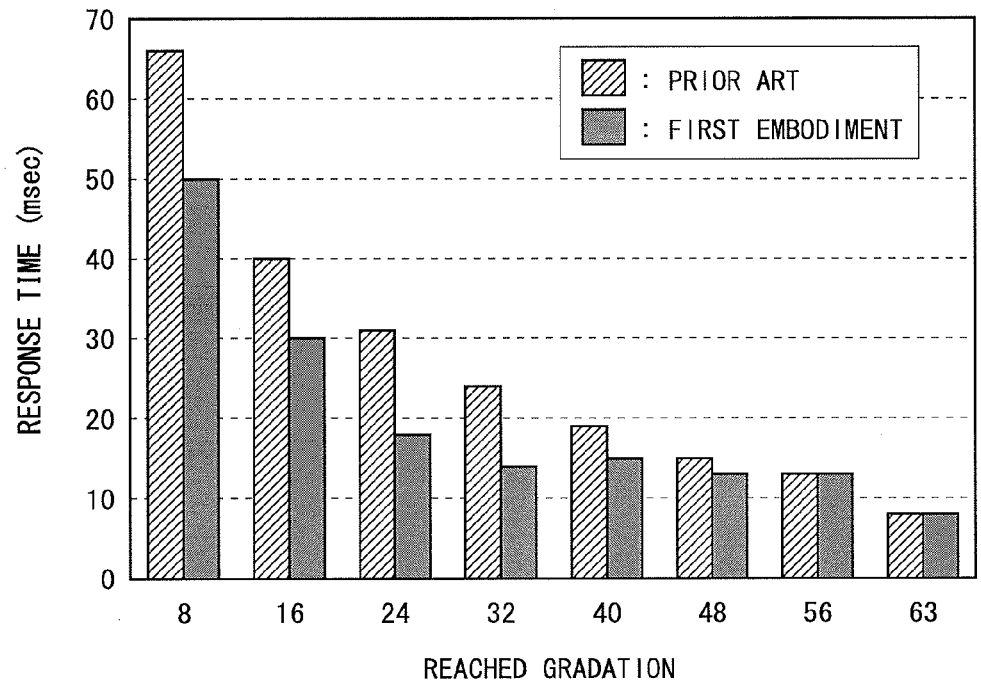
FIG. 5A is a diagram showing the response time at room temperature of the liquid crystal display device according to the first embodiment.
Figure 5B:
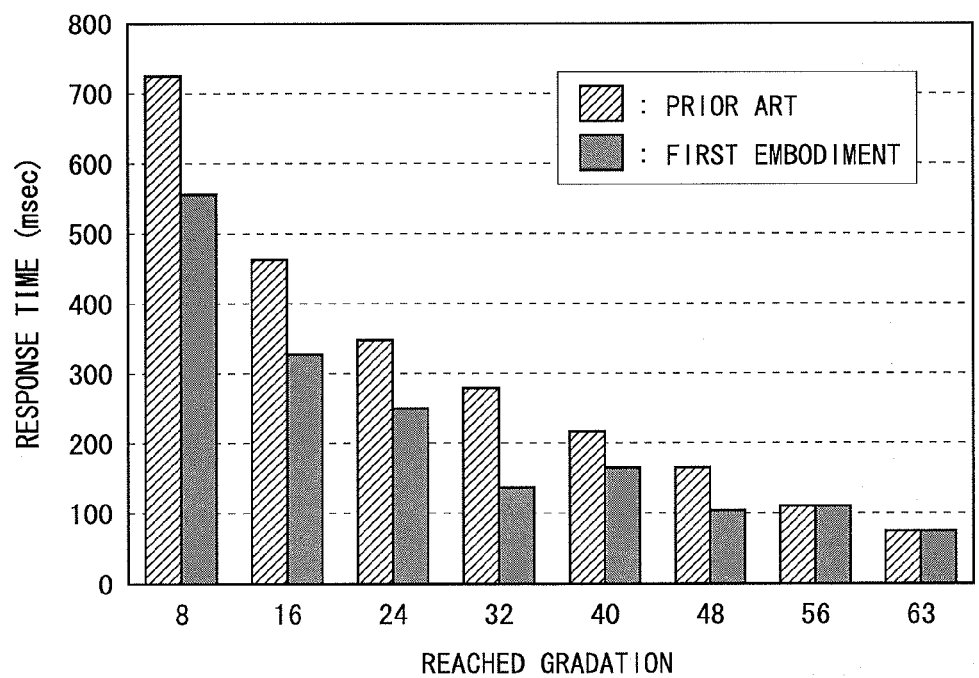
FIG. 5B is a diagram showing the response time at a low temperature of the liquid crystal display device according to the first embodiment.

FIG. 5A is a diagram showing the response time at room temperature (25° C.) of the liquid crystal display device according to the present embodiment. FIG. 5B is a diagram showing the response time at a low temperature (−20° C.) of the liquid crystal display device according to the present embodiment. These response times are obtained by computing 10% to 90% transition times when the gradation of a pixel changes from 0 to each reached gradation in the liquid crystal display device according to the present embodiment, based on response times measured for a given monochrome liquid crystal display device. As shown in FIG. 5A, for example, when the reached gradation is 8, while the conventional response time at room temperature is 66 msec, the response time at room temperature in the present embodiment is 50 msec. In this case, the response time is reduced by 24%. In addition, as shown in FIG. 5B, when the reached gradation is 8, while the conventional response time at the low temperature is 725 msec, the response time at the low temperature in the present embodiment is 556 msec. In this case, the response time is reduced by 23%. As such, although the degree of improvement varies depending on the temperature and reached gradation, according to the liquid crystal display device 10 according to the present embodiment, the response time can be reduced.

Second Embodiment

Figure 6:
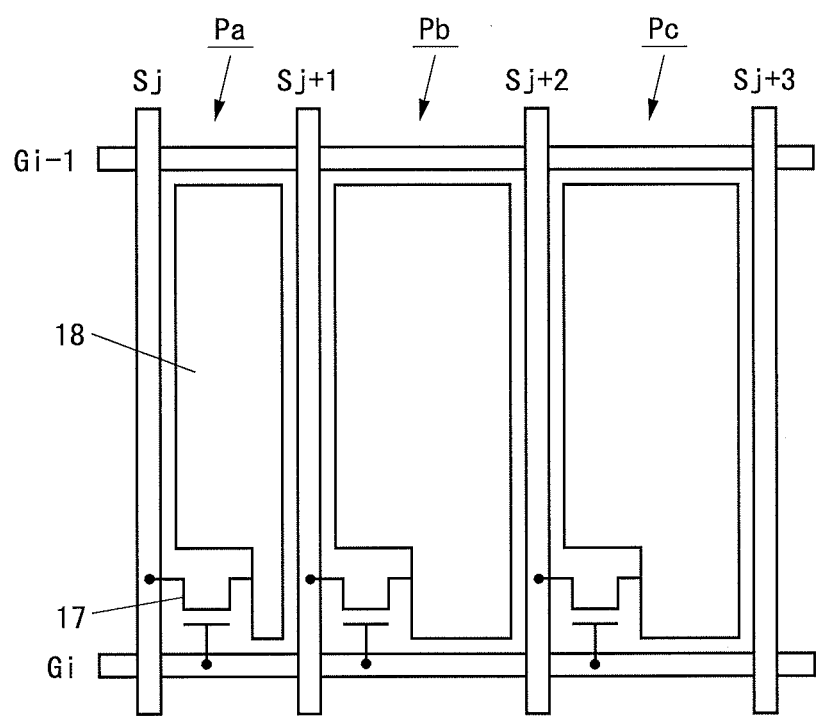
FIG. 6 is a diagram showing a configuration of a pixel of a liquid crystal display device according to a second embodiment of the present invention.

A liquid crystal display device according to a second embodiment of the present invention has the same configuration as the liquid crystal display device 10 according to the first embodiment (FIG. 1). FIG. 6 is a diagram showing a configuration of a pixel P according to the present embodiment. As shown in FIG. 6, the pixel P is constituted by three subpixels Pa, Pb, and Pc. In the present embodiment, the area ratio of the subpixels Pa, Pb, and Pc is 1:2:2. In the present embodiment, the subpixel Pa is a minimum-area subpixel, and the following equation (6) holds between transmittances T, Ta, Tb, and Tc:

$$T=Ta\times\tfrac{1}{5}+Tb\times\tfrac{2}{5}+Tc\times\tfrac{2}{5} \quad (6)$$

According to the liquid crystal display device according to the present embodiment, by forming a pixel P using subpixels Pa, Pb, and Pc having different areas, compared to the case where a pixel is formed using subpixels having equal areas, the area of the subpixel Pa which is a minimum-area subpixel is reduced, thereby increasing a voltage applied to the subpixel Pa when a low gradation is displayed, enabling to improve the response speed when the low gradation is displayed.

In the present embodiment, display gradations La, Lb, and Lc are determined by a method similar to that of the first embodiment. However, when the display gradation of a first subpixel cannot be determined to satisfy the condition regarding the transmittances, one of a first process in which second subpixels are selected from the subpixels Pa, Pb, and Pc, and with setting the gradation of the remaining subpixel to its maximum gradation or minimum gradation, the display gradations of the second subpixels are determined to obtain a gradation higher than or equal to the target gradation L of the pixel; and a second process in which the gradation of the first subpixel is determined with changing the gradations set to other subpixels is performed.

Figure 7:
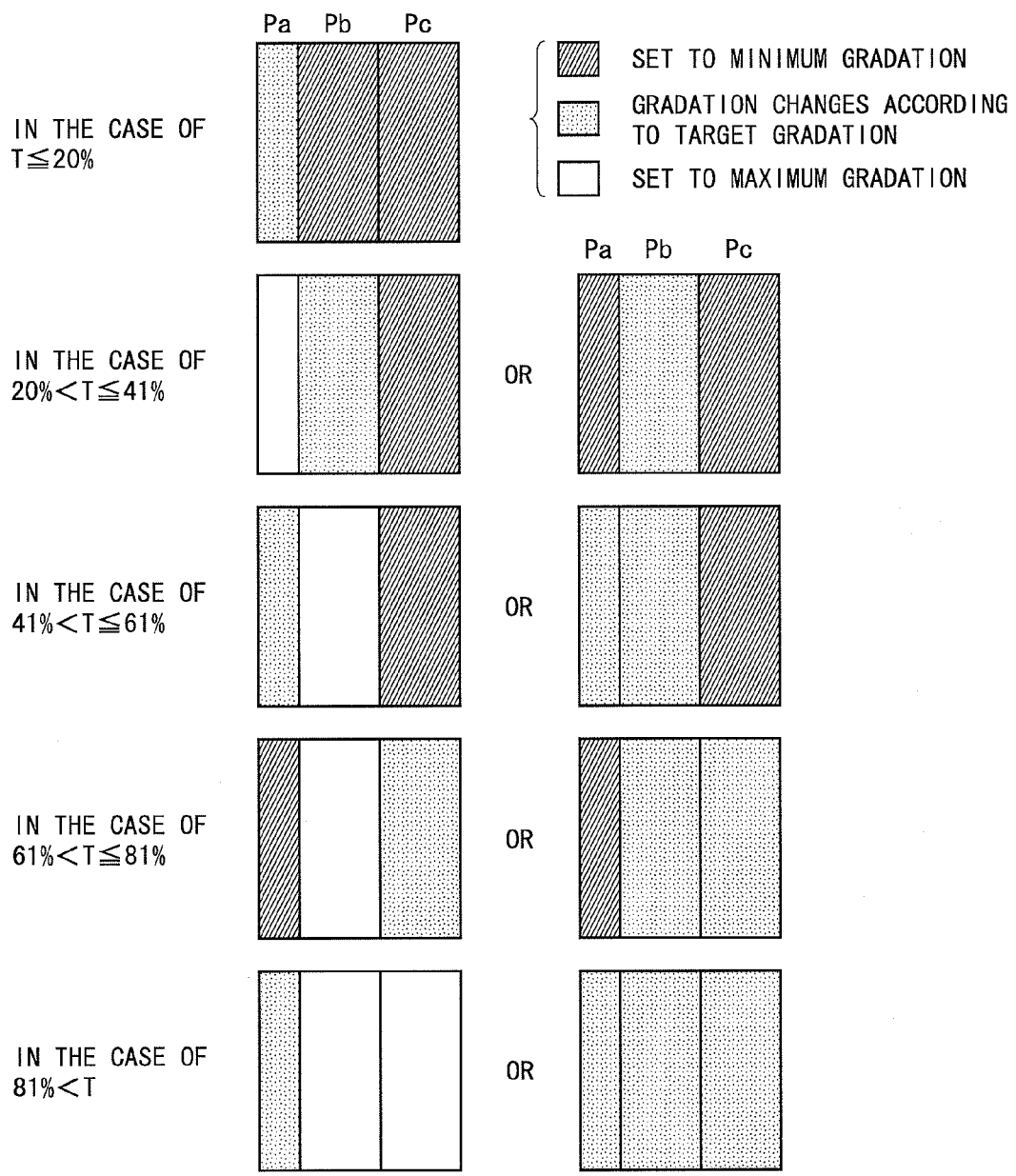
FIG. 7 is a diagram for describing a method of determining the display gradations of subpixels of the liquid crystal display device according to the second embodiment.
Figure 8:
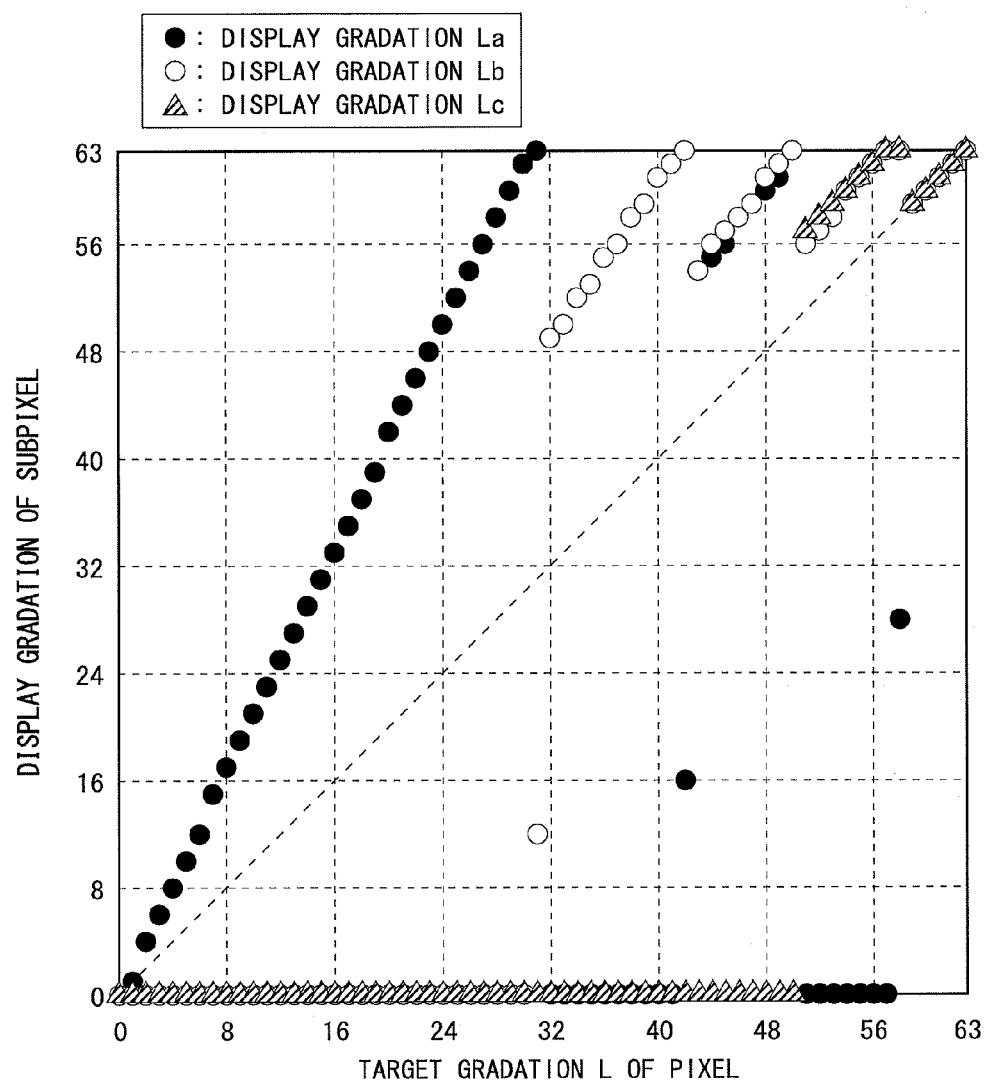
FIG. 8 is a diagram showing the gradation conversion characteristics of the liquid crystal display device according to the second embodiment.

A specific example of the method of determining display gradations La, Lb, and Lc in the present embodiment will be described below. As in the first embodiment, the target gradation L and the display gradations La, Lb, and Lc are integers between 0 and 63 inclusive, and γ characteristics of γ=2.2 are to be achieved. In the present embodiment, an analysis is divided into five cases according to a transmittance T determined using the above equation (2) (see FIG. 7). Association of the display gradations La, Lb, and Lc determined by the following method with the target gradation L is as shown in FIG. 8.

(B1) In the Case of T≤20%

To represent the target gradation L, the subpixel Pa which is a minimum-area subpixel is selected. With setting the display gradations Lb and Lc to their minimum gradations, the display gradation La is determined according to the target gradation L. Specifically, with setting Lb=Lc=0, La is determined so that $|T-Ta\times1/5|$ is minimized.

(B2) In the Case of 20%<T≤41%

The subpixel Pb is selected as a first subpixel, and with setting the display gradation La to its maximum gradation and setting the display gradation Lc to its minimum gradation, the display gradation Lb is determined according to the target gradation L to satisfy the condition regarding the transmittances. When the display gradation Lb cannot be determined to satisfy the condition, with the subpixel Pb remaining selected as the first subpixel and setting the display gradations La and Lc to their minimum gradations, the display gradation Lb is determined (second process). Specifically, first, with setting La=63 and Lc=0, Lb is determined so that $|T-(Ta\times1/5+Tb\times2/5)|$ is minimized. When the determined Lb does not satisfy the condition "$(Tb\times2/5)/(Ta\times1/5+Tb\times2/5)<0.05$", i.e., the condition "$2Tb/(Ta+2Tb)<0.05$", with setting La=Lc=0, Lb at which $|T-Tb\times2/5|$ is minimized is selected.

(B3) In the Case of 41%<T≤61%

The subpixel Pa is selected as a first subpixel, and with setting the display gradation Lb to its maximum gradation and setting the display gradation Lc to its minimum gradation, the display gradation La is determined according to the target gradation L to satisfy the condition regarding the transmittances. When the display gradation La cannot be determined to satisfy the condition, the subpixels Pa and Pb are selected as second subpixels, and with setting the display gradation Lc to its minimum gradation, the display gradations La and Lb are determined to obtain a gradation higher than or equal to the target gradation L (first process). Specifically, first, with setting Lb=63 and Lc=0, La is determined so that $|T-(Ta\times1/5+Tb\times2/5)|$ is minimized. When the determined La does not satisfy the condition "$(Ta\times1/5)/(Ta\times1/5+Tb\times2/5)<0.05$", i.e., the condition "$Ta/(Ta+2Tb)<0.05$", maximum La and Lb which satisfy La and Lb≥L and at which $|T-(Ta\times1/5+Tb\times2/5)|$ is minimized are selected.

(B4) In the Case of 61%<T≤81%

The subpixel Pc is selected as a first subpixel, and with setting the display gradation La to its minimum gradation and setting the display gradation Lb to its maximum gradation, the display gradation Lc is determined according to the target gradation L to satisfy the condition regarding the transmittances. When the display gradation Lc cannot be determined to satisfy the condition, the subpixels Pb and Pc are selected as second subpixels, and with setting the display gradation La to its minimum gradation, the display gradations Lb and Lc are determined to obtain a gradation higher than or equal to the target gradation L (first process). Specifically, first, with setting La=0 and Lb=63, Lc is determined so that $|T-(Tb\times2/5+Tc\times2/5)|$ is minimized. When the determined Lc does not satisfy the condition "$(Tc\times2/5)/(Tb\times2/5+Tc\times2/5)<0.05$", i.e., the condition "$2Tc/(2Tb+2Tc)<0.05$", maximum Lb and Lc which satisfy Lb and Lc≥L and at which $|T-(Tb\times2/5+Tc\times2/5)|$ is minimized are selected.

(B5) In the Case of 81%<T

The subpixel Pa is selected as a first subpixel, and with setting the display gradations Lb and Lc to their maximum gradations, the display gradation La is determined according to the target gradation L to satisfy the condition regarding the transmittances. When the display gradation La cannot be determined to satisfy the condition, the subpixels Pa, Pb, and Pc are selected as second subpixels, and the display gradations La, Lb, and Lc are determined to obtain a gradation higher than or equal to the target gradation L (first process). Specifically, first, with setting Lb=Lc=63, La is determined so that $|T-(Ta\times1/5+Tb\times2/5+Tc\times2/5)|$ is minimized. When the determined La does not satisfy the condition "$(Ta\times1/5)/(Ta\times1/5+Tb\times2/5+Tc\times2/5)<0.05$", i.e., the condition "$Ta/(Ta+2Tb+2Tc)<0.05$", maximum La, Lb, and Lc which satisfy La, Lb, and Lc≥L and at which $|T-(Ta\times1/5+Tb\times2/5+Tc\times2/5)|$ is minimized are selected.

Figure 9A:
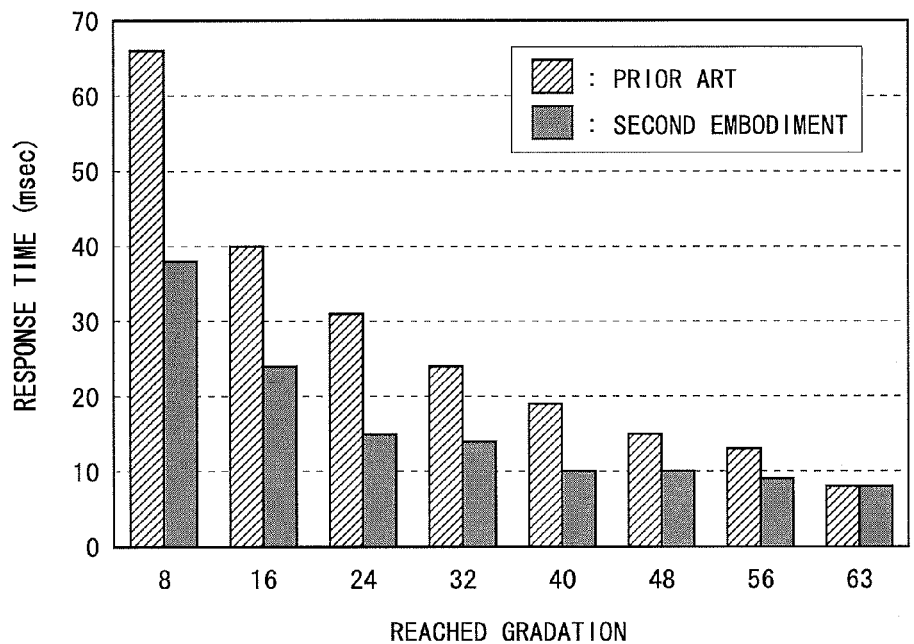
FIG. 9A is a diagram showing the response time at room temperature of the liquid crystal display device according to the second embodiment.
Figure 9B:
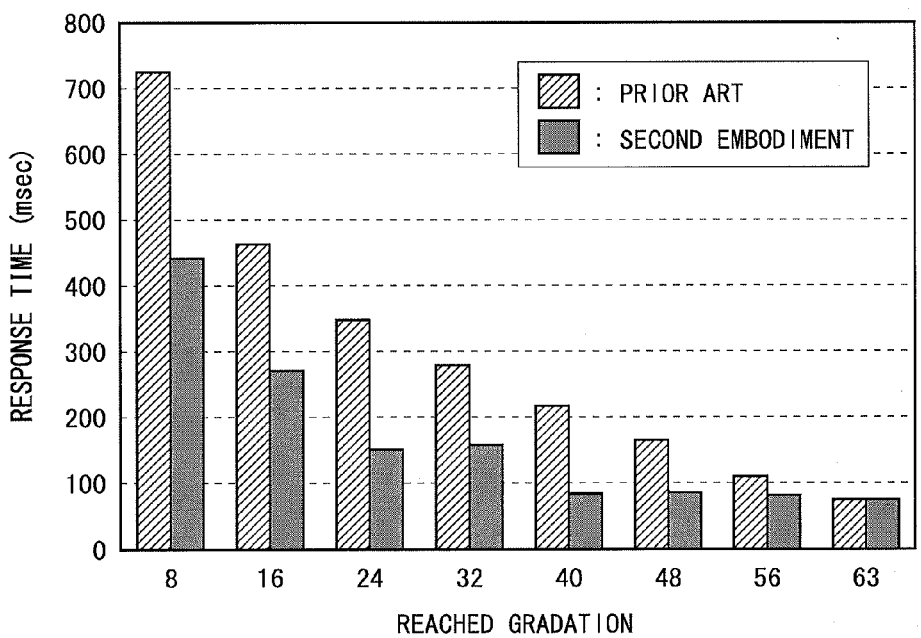
FIG. 9B is a diagram showing the response time at a low temperature of the liquid crystal display device according to the second embodiment.

FIG. 9A is a diagram showing the response time at room temperature (25° C.) of the liquid crystal display device according to the present embodiment. FIG. 9B is a diagram showing the response time at a low temperature (−20° C.) of the liquid crystal display device according to the present embodiment. These response times are calculated by the same method as that of the first embodiment. As shown in FIGS. 9A and 9B, although the degree of improvement varies depending on the temperature and reached gradation, according to the liquid crystal display device according to the present embodiment, the response time can be reduced.

Third Embodiment

Figure 10:
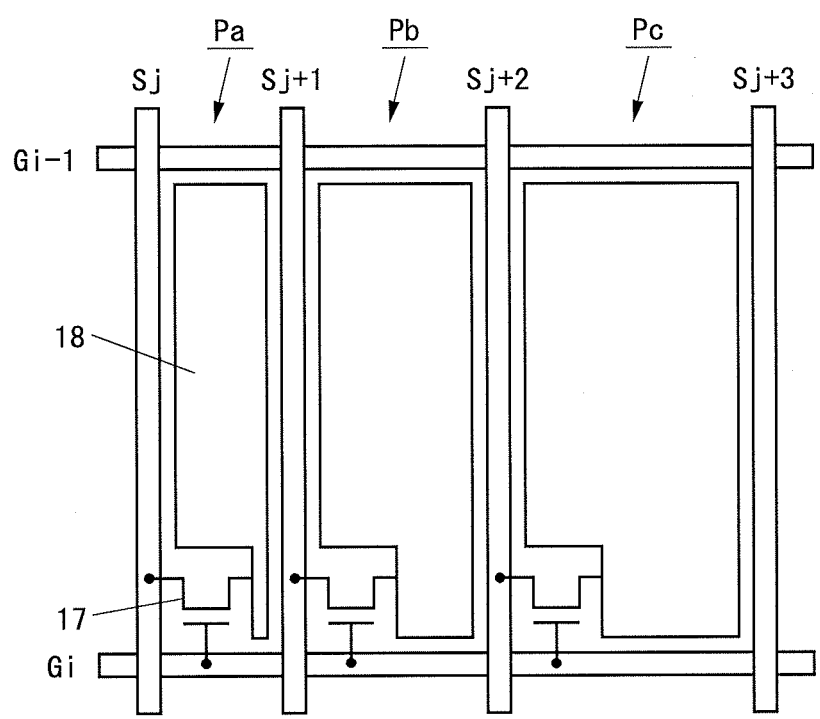
FIG. 10 is a diagram showing a configuration of a pixel of a liquid crystal display device according to a third embodiment of the present invention.

A liquid crystal display device according to a third embodiment of the present invention has the same configuration as the liquid crystal display device 10 according to the first embodiment (FIG. 1). FIG. 10 is a diagram showing a configuration of a pixel P according to the present embodiment. As shown in FIG. 10, the pixel P is constituted by three subpixels Pa, Pb, and Pc. In the present embodiment, the area ratio of the subpixels Pa, Pb, and Pc is 1:2:3. In the present embodiment, the subpixel Pa is a minimum-area subpixel, and the following equation (7) holds between transmittances T, Ta, Tb, and Tc:

$$T=Ta\times1/6+Tb\times2/6+Tc\times3/6 \quad (7)$$

According to the liquid crystal display device according to the present embodiment, as in the second embodiment, by forming a pixel P using subpixels Pa, Pb, and Pc having different areas, compared to the case where a pixel is formed using subpixels having equal areas, the area of the subpixel Pa which is a minimum-area subpixel is reduced, thereby increasing a voltage applied to the subpixel Pa when a low gradation is displayed, enabling to improve the response speed when the low gradation is displayed.

In the present embodiment, display gradations La, Lb, and Lc are determined by a method similar to that of the first embodiment. However, when the display gradation of a first subpixel cannot be determined to satisfy the condition regarding the transmittances, one of the above-described first process, the above-described second process, and a third process in which one subpixel different from the first subpixel is selected as a third subpixel, and with setting the gradations of other subpixels to their maximum gradations or minimum gradations, the gradation of the third subpixel is determined is performed.

Figure 11:
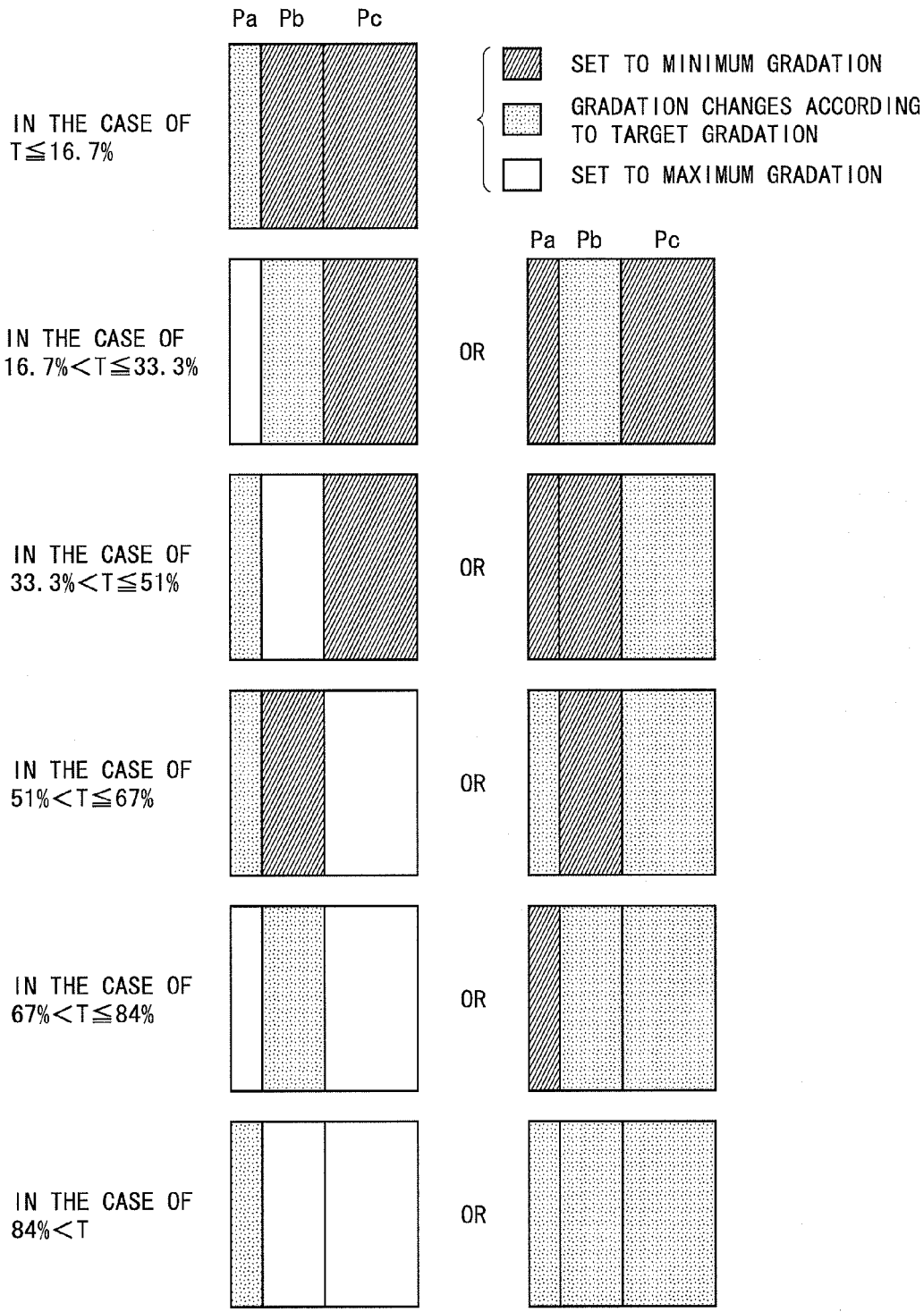
FIG. 11 is a diagram for describing a method of determining the display gradations of subpixels of the liquid crystal display device according to the third embodiment.
Figure 12:
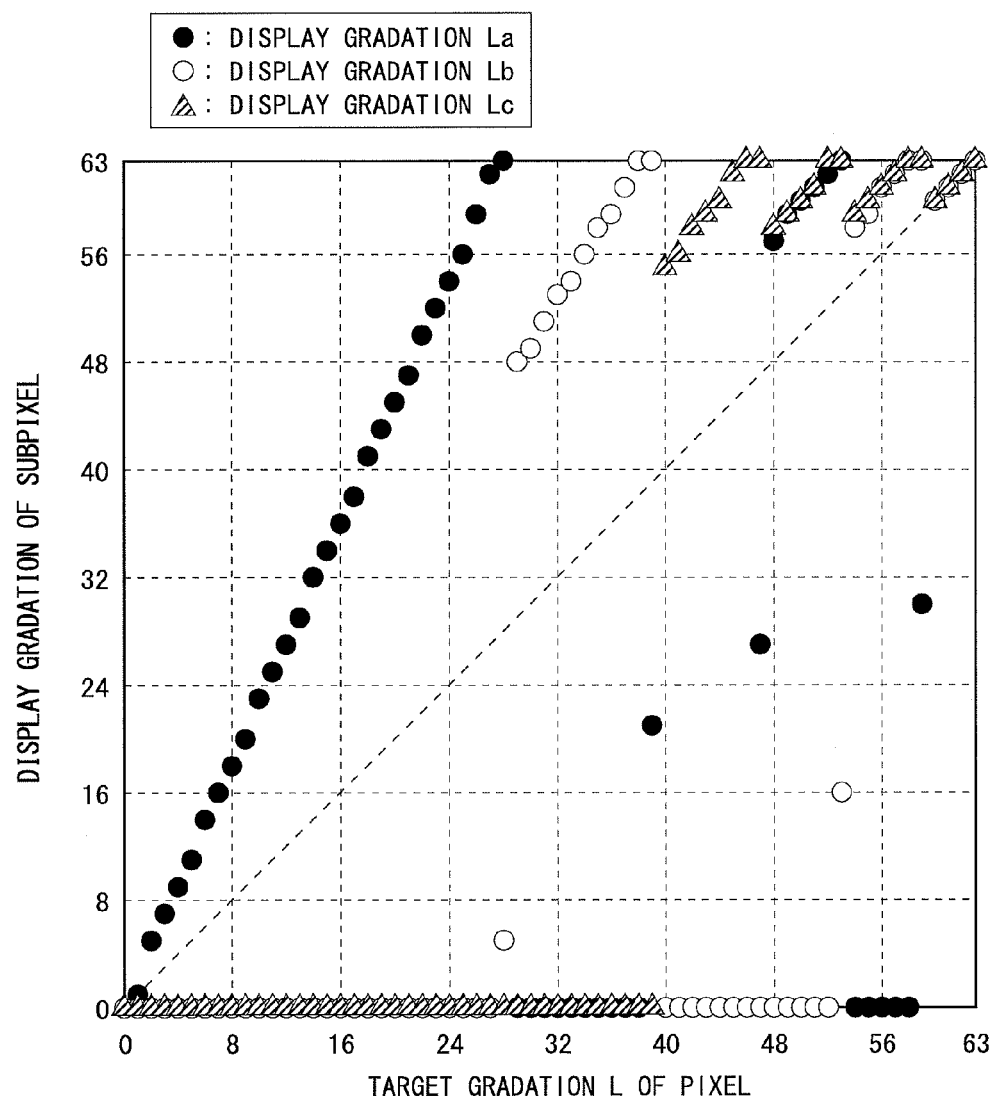
FIG. 12 is a diagram showing the gradation conversion characteristics of the liquid crystal display device according to the third embodiment.

A specific example of the method of determining display gradations La, Lb, and Lc in the present embodiment will be described below. As in the first embodiment, the target gradation L and the display gradations La, Lb, and Lc are integers between 0 and 63 inclusive, and γ characteristics of γ=2.2 are to be achieved. In the present embodiment, an analysis is divided into six cases according to a transmittance T determined using the above equation (2) (see FIG. 11). Association of the display gradations La, Lb, and Lc determined by the following method with the target gradation L is as shown in FIG. 12.

(C1) In the Case of T≤16.7%

To represent the target gradation L, the subpixel Pa which is a minimum-area subpixel is selected. With setting the display gradations Lb and Lc to their minimum gradations, the display gradation La is determined according to the target gradation L. Specifically, with setting Lb=Lc=0, La is determined so that |T−Ta×⅙| is minimized.

(C2) In the Case of 16.7%<T≤33.3%

The subpixel Pb is selected as a first subpixel, and with setting the display gradation La to its maximum gradation and setting the display gradation Lc to its minimum gradation, the display gradation Lb is determined according to the target gradation L to satisfy the condition regarding the transmittances. When the display gradation Lb cannot be determined to satisfy the condition, with the subpixel Pb remaining selected as the first subpixel and setting the display gradations La and Lc to their minimum gradations, the display gradation Lb is determined (second process). Specifically, first, with setting La=63 and Lc=0, Lb is determined so that |T−(Ta×⅙+Tb×⅔)| is minimized. When the determined Lb does not satisfy the condition "(Tb×⅔)/(Ta×⅙+Tb×⅔)<0.05", i.e., the condition "2Tb/(Ta+2Tb)<0.05", with setting La=Lc=0, Lb at which |T−Tb×⅔| is minimized is selected.

(C3) In the Case of 33.3%<T≤51%

The subpixel Pa is selected as a first subpixel, and with setting the display gradation Lb to its maximum gradation and setting the display gradation Lc to its minimum gradation, the display gradation La is determined according to the target gradation L to satisfy the condition regarding the transmittances. When the display gradation La cannot be determined to satisfy the condition, the subpixel Pc is selected as a third subpixel, and with setting the display gradations La and Lb to their minimum gradations, the display gradation Lc is determined (third process). Specifically, first, with setting Lb=63 and Lc=0, La is determined so that |T−(Ta×⅙+Tb×⅔)| is minimized. When the determined La does not satisfy the condition "(Ta×⅙)/(Ta×⅙+Tb×⅔)<0.05", i.e., the condition "Ta/(Ta+2Tb)<0.05", with setting La=Lb=0, Lc at which |T−Tc×½| is minimized is selected.

(C4) In the Case of 51%<T 67%

The subpixel Pa is selected as a first subpixel, and with setting the display gradation Lb to its minimum gradation and setting the display gradation Lc to its maximum gradation, the display gradation La is determined according to the target gradation L to satisfy the condition regarding the transmittances. When the display gradation La cannot be determined to satisfy the condition, the subpixels Pa and Pc are selected as second subpixels, and with setting the display gradation Lb to its minimum gradation, the display gradations La and Lc are determined to obtain a gradation higher than or equal to the target gradation L (first process). Specifically, first, with setting Lb=0 and Lc=63, La is determined so that |T−(Ta×⅙+Tc×½)| is minimized. When the determined La does not satisfy the condition "(Ta×⅙)/(Ta×⅙+Tc×½)<0.05", i.e., the condition "Ta/(Ta+3Tc)<0.05", with setting Lb=0, maximum La and Lc which satisfy La and Lc≥L and at which |T−(Ta×⅙+Tc×½)| is minimized are selected.

(C5) In the Case of 67%<T≤84%

The subpixel Pb is selected as a first subpixel, and with setting the display gradations La and Lc to their maximum gradations, the display gradation Lb is determined according to the target gradation L to satisfy the condition regarding the transmittances. When the display gradation Lb cannot be determined to satisfy the condition, the subpixels Pb and Pc are selected as second subpixels, and with setting the display gradation La to its minimum gradation, the display gradations Lb and Lc are determined to obtain a gradation higher than or equal to the target gradation L (first process). Specifically, first, with setting La=Lc=63, Lb is determined so that |T−(Ta×⅙+Tb×⅔+Tc×½)| is minimized. When the determined Lb does not satisfy the condition "(Tb×⅔)/(Ta×⅙+Tb×⅔+Tc×½)<0.05", i.e., the condition "2Tb/(Ta+2Tb+3Tc)<0.05", with setting La=0, maximum Lb and Lc which satisfy Lb and Lc≥L and at which |T−(Tb×⅔+Tc×½)| is minimized are selected.

(C6) In the Case of 84%<T

The subpixel Pa is selected as a first subpixel, and with setting the display gradations Lb and Lc to their maximum gradations, the display gradation La is determined according to the target gradation L to satisfy the condition regarding the transmittances. When the display gradation La cannot be determined to satisfy the condition, the subpixels Pa, Pb, and Pc are selected as second subpixels, and the display gradations La, Lb, and Lc are determined to obtain a gradation higher than or equal to the target gradation L (first process). Specifically, first, with setting Lb=Lc=63, La is determined so that |T−(Ta×⅙+Tb×⅔+Tc×½)| is minimized. When the determined La does not satisfy the condition "(Ta×⅙)/(Ta×⅙+Tb×⅔+Tc×½)<0.05", i.e., the condition "Ta/(Ta+2Tb+3Tc)<0.05", maximum La, Lb and Lc which satisfy La, Lb, and Lc≥L and at which |T−(Ta×⅙+Tb×⅔+Tc×½)| is minimized are selected.

Figure 13A:
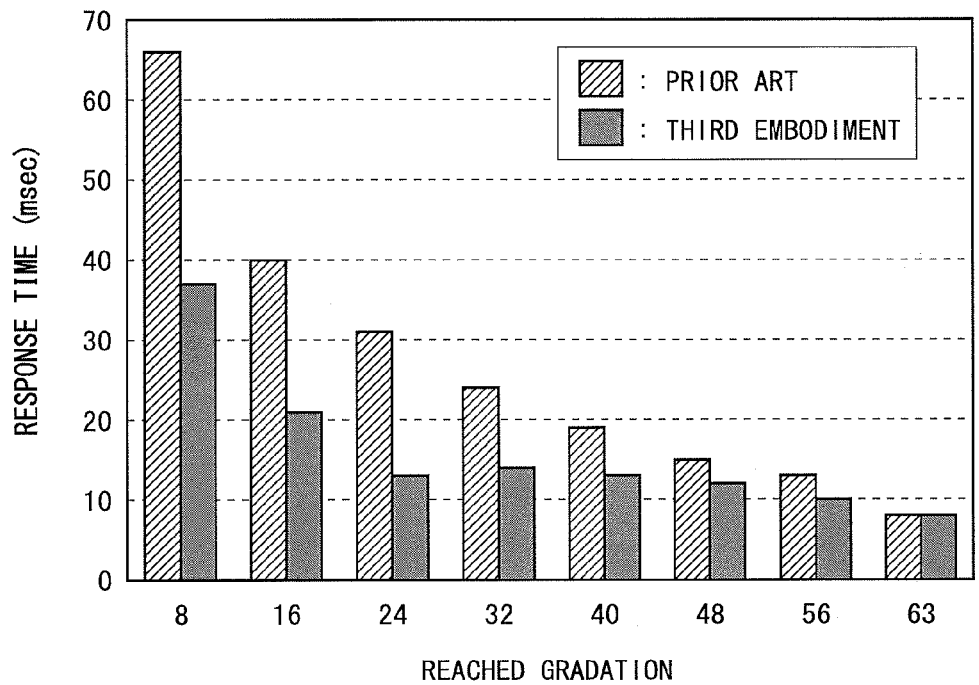
FIG. 13A is a diagram showing the response time at room temperature of the liquid crystal display device according to the third embodiment.
Figure 13B:
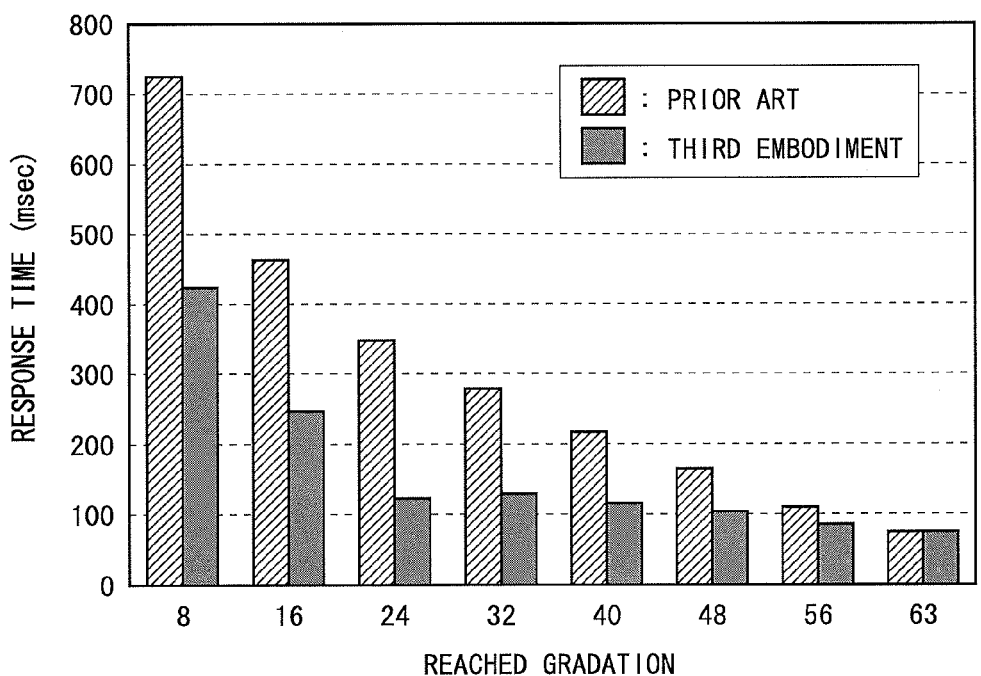
FIG. 13B is a diagram showing the response time at a low temperature of the liquid crystal display device according to the third embodiment.

FIG. 13A is a diagram showing the response time at room temperature (25° C.) of the liquid crystal display device according to the present embodiment. FIG. 13B is a diagram showing the response time at a low temperature (−20° C.) of the liquid crystal display device according to the present embodiment. These response times are calculated by the same method as that of the first embodiment. As shown in FIGS. 13A and 13B, although the degree of improvement varies depending on the temperature and reached gradation, according to the liquid crystal display device according to the present embodiment, the response time can be reduced.

When the area occupancy rates of the subpixels Pa, Pb, and Pc in the pixel P are Xa %, Xb %, and Xc % (note that Xa≤Xb≤Xc and Xa+Xb+Xc=100), respectively, the display gradations La, Lb, and Lc can be determined by replacing, in the above-described case analysis of (C1) to (C6), 16.7% with Xa %, 33.3% with Xb %, 51% with (Xa+Xb) %, 67% with (Xa+Xc) %, and 84% with (Xb+Xc) %, and by replacing, in those equations and conditional expressions to obtain a minimum value, the coefficient "⅙" by which the transmittance Ta is multiplied with "Xa/100", the coefficient "⅓" by which the transmittance Tb is multiplied with "Xb/100", and the coefficient "½" by which the transmittance Tc is multiplied with "Xc/100".

Figure 14:
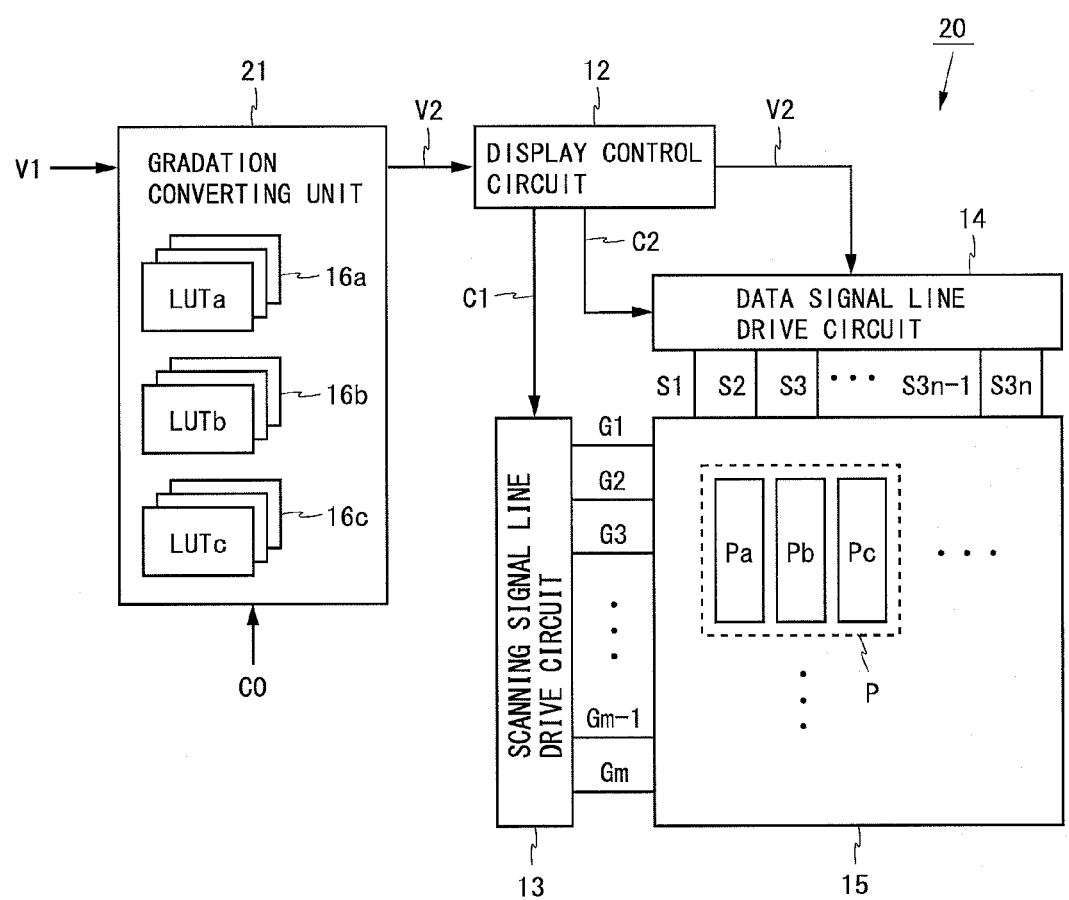
FIG. 14 is a block diagram showing a configuration of a liquid crystal display device according to a variant of the embodiments of the present invention.

Although, in the first to third embodiments, liquid crystal display devices that achieve one type of γ characteristics are described, a liquid crystal display device of the present invention may have the function of changing the γ characteristics. A liquid crystal display device 20 shown in FIG. 14 is such that in the liquid crystal display device 10 according to the first embodiment (FIG. 1) the gradation converting unit 11 is replaced with a gradation converting unit 21. The gradation converting unit 21 includes a plurality of LUTs 16a and as many LUTs 16b and 16c. A given LUT 16a stores display gradations La associated with target gradations L in order to achieve given γ characteristics. Another LUT 16a stores different display gradations La associated with the target gradations L in order to achieve different γ characteristics. The LUTs 16b and the LUTs 16c are also the same as the LUTs 16a. The gradation converting unit 21 selects one LUT to be used from each of the plurality of LUTs 16a, the plurality of LUTs 16b, and the plurality of LUTs 16c, in accordance with a control signal C0 provided thereto. By thus providing a plurality of LUTs in the gradation converting unit 21 in association with a plurality of gamma characteristics and selecting LUTs used for gradation conversion, various types of γ characteristics can be achieved.

In addition, although in the first to third embodiments one pixel is constituted by three subpixels, the number of subpixels forming one pixel may be any number greater than or equal to 2. For example, also in a liquid crystal display device in which one pixel is constituted by four subpixels, gradation conversion characteristics in a gradation converting unit can be determined by a method similar to those of the first to third embodiments. The same applies to a liquid crystal display device in which one pixel is constituted by five or more subpixels.

In general, a liquid crystal display device of the present invention is a normally black mode liquid crystal display device that performs monochrome gradation display, and includes a liquid crystal panel including a plurality of pixels, each constituted by a plurality of subpixels whose transmittances can be controlled independently of each other; a gradation converting unit that converts a gradation of each pixel included in an input video signal to gradations of a plurality of subpixels; and a drive circuit that drives the liquid crystal panel based on a video signal obtained by the gradation converting unit. Characteristics of the gradation conversion by the gradation converting unit are obtained by performing, in a case where the gradation of the pixel can be represented by only one minimum-area subpixel, a process in which with setting gradations of other subpixels to their minimum gradations, a gradation of the minimum-area subpixel is determined, and by performing, in other cases, one of a first process in which one subpixel is selected as a first subpixel, and with setting gradations of other subpixels to their maximum gradations or minimum gradations, a gradation of the first subpixel is determined so that a ratio of a transmittance of the first subpixel to a transmittance of the pixel is less than a limit value, and when the gradation of the first subpixel cannot be determined to satisfy the condition regarding the transmittances, a plurality of subpixels are selected as second subpixels, and with setting a gradation of a remaining subpixel to its maximum gradation or minimum gradation, gradations of the second subpixels are determined to obtain a gradation higher than or equal to the gradation of the pixel; a second process in which the gradation of the first subpixel is determined with changing the gradations set to other subpixels; and a third process in which one subpixel different from the first subpixel is selected as a third subpixel, and with setting gradations of other subpixels to their maximum gradations or minimum gradations, a gradation of the third subpixel is determined. According to such a liquid crystal display device, response speed can be improved at low cost.

INDUSTRIAL APPLICABILITY

A liquid crystal display device of the present invention has the feature of having response speed improved at low cost, and thus can be used in the display units of various devices, and the like.

The invention claimed is:

1. A normally black mode liquid crystal display device that performs monochrome gradation display, the liquid crystal display device comprising:
   a liquid crystal panel including a plurality of pixels, each constituted by a plurality of subpixels whose transmittances can be controlled independently of each other;
   a gradation converting unit that converts a gradation of each pixel included in an input video signal to gradations of a plurality of subpixels; and
   a drive circuit that drives the liquid crystal panel based on a video signal obtained by the gradation converting unit, wherein
   characteristics of the gradation conversion by the gradation converting unit are obtained by performing, in a case where the gradation of the pixel can be represented by only one minimum-area subpixel, a process in which with setting gradations of other subpixels to their minimum gradations, a gradation of the minimum-area subpixel is determined, and by performing, in other cases, one of a first process in which one subpixel is selected as a first subpixel, and with setting gradations of other subpixels to their maximum gradations or minimum gradations, a gradation of the first subpixel is determined so that a ratio of a transmittance of the first subpixel to a transmittance of the pixel is less than a limit value, and when the gradation of the first subpixel cannot be determined to satisfy the condition regarding the transmittances, a plurality of subpixels are selected as second subpixels, and with setting a gradation of a remaining subpixel to its maximum gradation or minimum gradation, gradations of the second subpixels are determined to obtain a gradation higher than or equal to the gradation of the pixel; a second process in which the gradation of the first subpixel is determined with changing the gradations set to other subpixels; and a third process in which one subpixel different from the first subpixel is selected as a third subpixel, and with setting gradations of other subpixels to their maximum gradations or minimum gradations, a gradation of the third subpixel is determined.

2. The liquid crystal display device according to claim 1, wherein each pixel of the liquid crystal panel is constituted by a plurality of subpixels having equal areas.

3. The liquid crystal display device according to claim 2, wherein each pixel of the liquid crystal panel is constituted by three subpixels with an area ratio of 1:1:1.

4. The liquid crystal display device according to claim 1, wherein each pixel of the liquid crystal panel is constituted by a plurality of subpixels including subpixels having different areas.

5. The liquid crystal display device according to claim 4, wherein each pixel of the liquid crystal panel is constituted by three subpixels with an area ratio of 1:2:2.

6. The liquid crystal display device according to claim 1, wherein each pixel of the liquid crystal panel is constituted by a plurality of subpixels having different areas.

7. The liquid crystal display device according to claim 6, wherein each pixel of the liquid crystal panel is constituted by three subpixels with an area ratio of 1:2:3.

8. The liquid crystal display device according to claim 1, wherein the gradation converting unit includes a lookup table, and converts a gradation of a pixel into gradations of a plurality of subpixels using the look up table.

9. The liquid crystal display device according to claim 8, wherein the gradation converting unit includes a plurality of look up tables in association with a plurality of gamma characteristics, and converts a gradation of a pixel into gradations of a plurality of subpixels using a look up table selected from the plurality of look up tables.

10. The liquid crystal display device according to claim 1, wherein the limit value is a value of 0.1 or less.

11. The liquid crystal display device according to claim 1, wherein the limit value is a value of 0.05 or less.

12. The liquid crystal display device according to claim 1, wherein the liquid crystal panel is a vertical alignment-type liquid crystal panel.

13. A method of driving a normally black mode liquid crystal display device that has a liquid crystal panel including a plurality of pixels, each constituted by a plurality of subpixels whose transmittances are controlled independently of each other, and that performs monochrome gradation display, the method comprising the steps of:

converting a gradation of each pixel included in an input video signal to gradations of a plurality of subpixels; and driving the liquid crystal panel based on an obtained video signal, wherein characteristics of the gradation conversion in the step of performing the gradation conversion are obtained by performing, in a case where the gradation of the pixel can be represented by only one minimum-area subpixel, a process in which with setting gradations of other subpixels to their minimum gradations, a gradation of the minimum-area subpixel is determined, and by performing, in other cases, one of a first process in which one subpixel is selected as a first subpixel, and with setting gradations of other subpixels to their maximum gradations or minimum gradations, a gradation of the first subpixel is determined so that a ratio of a transmittance of the first subpixel to a transmittance of the pixel is less than a limit value, and when the gradation of the first subpixel cannot be determined to satisfy the condition regarding the transmittances, a plurality of subpixels are selected as second subpixels, and with setting a gradation of a remaining subpixel to its maximum gradation or minimum gradation, gradations of the second subpixels are determined to obtain a gradation higher than or equal to the gradation of the pixel; a second process in which the gradation of the first subpixel is determined with changing the gradations set to other subpixels; and a third process in which one subpixel different from the first subpixel is selected as a third subpixel, and with setting gradations of other subpixels to their maximum gradations or minimum gradations, a gradation of the third subpixel is determined.

* * * * *